April 12, 1927.

T. E. McFALL 1,624,613

PISTON PACKING

Filed June 14, 1926

Inventor
Thurlow E. McFall
By Frank E. Liverance, Jr.
Attorney.

Patented Apr. 12, 1927.

1,624,613

UNITED STATES PATENT OFFICE.

THURLOW E. McFALL, OF SPARTA, MICHIGAN.

PISTON PACKING.

Application filed June 14, 1926. Serial No. 115,806.

This invention relates to a piston ring packing. In engines, particularly internal combustion engines used in motor vehicles, it is very desirable that the pistons shall be equipped with packing devices which will hold the compression, that is, will not permit the escape of gases downwardly past the piston into the crank case, and also which will not permit the passage of oil upwardly past the piston into the combustion chamber of the engine with the resultant formation of carbon and use of a great deal more oil than is required for lubrication purposes. Many types of piston rings have been devised for this purpose but from their very nature all are liable to permit the passage of oil upwardly into the combustion chamber due to the fact that the ring grooves must be slightly wider than the rings which fit therein and to the further fact that the rings cannot fit snugly against the bottoms of said grooves.

It is an object and purpose of the present invention to provide a piston packing wherein passage of oil upwardly to the combustion chamber of the engine is completely eliminated and this holds true no matter how long the packing is used, how much it may become worn and how large may be the gap at one side of the packing. To this end I have produced the packing fully described in the following description and illustrated in the accompanying drawing, in which—

Like reference characters refer to like parts in the different figures of the drawing.

Figure 1:
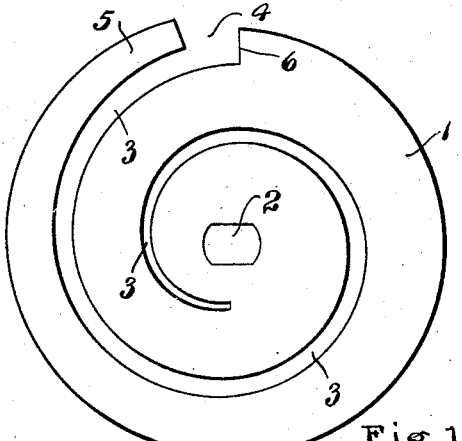
Fig. 1 is a plan view of one of the packing members or discs made in accordance with my invention.
Figure 2:
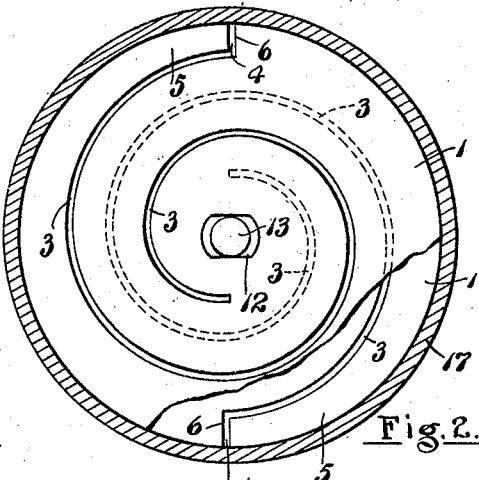
Fig. 2 is a cross section through a cylinder wherein a piston is mounted with at least two of the packing discs.

In the construction of the packing a flat disc 1 of metal, preferably cast iron, is provided which at its central point is formed with an opening 2 of a form such that when placed over a stud of substantially the same form it can not rotate around the stud. This disc is provided with a helical slot 3 which starts at its inner end a short distance from the opening 2 and has a length substantially of 540 degrees and with a progressively increasing width from its inner to its outer end. The metal between the grooves from its inner to its outer end has a substantially progressively diminishing width so that the terminal end 5 is the narrowest portion and is normally spaced by a gap 4 from a shoulder 6, as shown in Fig. 1. However, when the disc thus made is placed in a cylinder and the end of the part 5 is brought adjacent the shoulder 6 and the gap 4 diminished in extent the disc at its periphery assumes a circular shape so that it snugly fits the interior of a piston of the proper diameter as shown in Fig. 2, while the slot 3 is of substantially uniform width.

Figure 3:
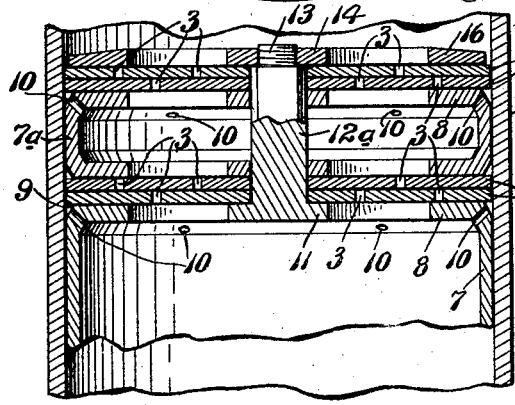
Fig. 3 is a fragmentary vertical section through a cylinder and piston therein showing the manner in which a larger number of the packing discs may be applied to the piston in spaced apart relation to each other.
Figure 4:
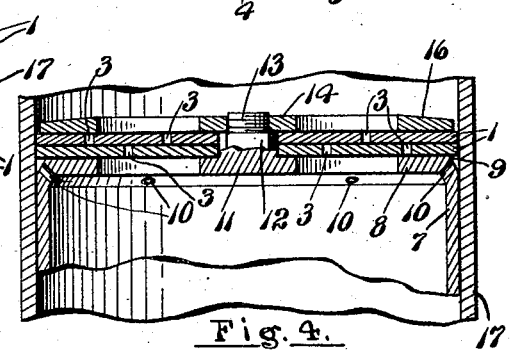
Fig. 4 is a view similar to Fig. 3 showing the packing discs applied to the piston at the upper end thereof only.
Figure 5:
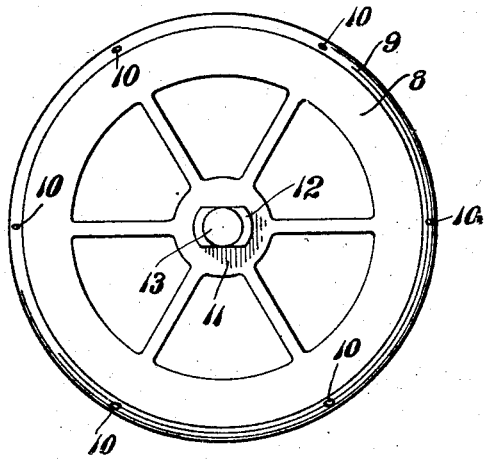
Fig. 5 is a plan view of the upper end of the piston with which the packing is associated.
Figure 6:
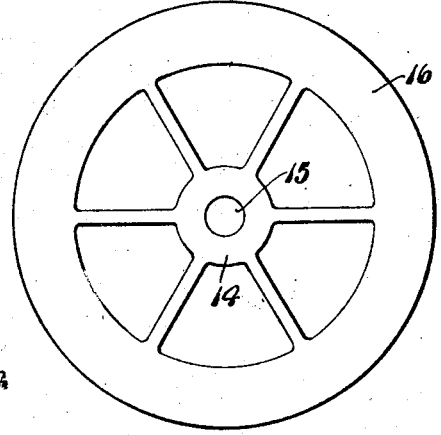
Fig. 6 is a plan view of the upper securing member which is used to hold the packing discs on the piston.

It is designed that at least two of these packing discs shall be placed at the upper end of a piston. The piston 7 has an upper end 8 which at its outer edge where it joins with the vertical walls of the piston is cut away making the annular inclined portion 9 through which at a plurality of spaced apart points downwardly and inwardly extending openings 10 are drilled to the interior of the piston, as best shown in Figs. 3 and 4. For lightening the weight of the piston parts of the upper side 8 are removed whereby the upper end of the piston has the appearance of a wheel with radiating spokes and a central hub 11 from which a stud 12 extends upwardly of a form such that it will pass through and fit the opening 2 in the packing discs used. Above this stud there is a further cylindrical extension 13 which is threaded for a purpose that will later appear.

One of the packing discs is placed over the stud 12 against the upper end 8 of the piston and over this packing disc a second disc is placed but turned to a position half way around the piston so that the gaps 4 in the packings lie at diametrically opposed sides of the piston. When thus placed together the slot 3 in the lower packing disc is completely covered by the metal in the upper disc and the slot in the upper disc at no point comes into conjunction with the slot 3 in the lower disc. This is fully shown in Fig. 2.

After the packing discs, at least two, have been thus placed together, an upper securing member is threaded onto the cylindrical projection 13. This member includes a central hub 14 with a threaded opening 15 therethrough, spokes radiating from the hub and an outer annular ring 16, the outer diameter of the ring 16 being slightly less than the diameter of the piston. This can be threaded onto the stud 13 and hold the discs in place, the hub 14 coming against the upper end of the stud 12 and leaving a very small space so that the tendency of the packing discs to spring outwardly is not restrained in any manner.

With the packing discs applied to a piston in the manner described and as fully illustrated in Fig. 4, on the down stroke of the piston, oil will be scraped from the walls of the cylinder into the annular recess underneath the outer edge portions of the lower packing discs which is made by removing the upper annular corner of the piston at 9 and this oil will be directed through the openings 10 to the interior of the piston where it will fall into the crank case. There is no possibility, such as occurs with piston rings in ring grooves, of the rings battering and widening the grooves and of oil passing underneath the rings into the grooves on the down stroke of the piston and thence upwardly inside of and over the rings to a point above the same so that it eventually reaches the combustion chamber. Any oil which may pass through the gap 4 into the spiral groove 3 in the lower packing disc cannot escape upwardly into the combustion chamber as the grooves 3 in the two packing discs do not cross each other at any point and there is no communication established in this manner. The packing discs completely eliminate any tendency to oil pumping or any other method whereby the oil can pass upwardly into the combustion chamber of the engine and this holds true irrespective of how much the discs may be worn at their outer edges or how much the gaps 4 may widen with such wearing. Furthermore the packing, by reason of its construction, bears with substantially uniform pressure against the inner walls of the cylinder and makes a very practical, substantial and efficient packing for pistons, particularly pistons of internal combustion engines.

In Fig. 3 a construction is shown whereby a plurality of the pairs of the packing discs may be used with a piston. In this case the piston 7 is constructed identically with that shown in Fig. 4 except the stud 12ª is longer than the stud 12 shown in Fig. 4 so that it may pass upwardly through a spacing piston section 7ª. Between the upper end of the piston 7 and the lower side of said piston section 7ª two of the packing discs 1 are placed around the stud 12ª. The piston section 7ª at its upper side has a top 8 with central hub through which the stud 12ª passes and above this two additional packing discs 1 are placed, the upper threaded end 13 formed integral with the stud 12ª, receiving the holding member in the same manner as before described. While one only of the piston sections 7ª is shown it is obvious that any desired number may be used so as to increase the numbers of packing discs to any desired degree. It is, of course, to be understood that the packing discs are not clamped and bound between the upper end of the piston 7 and the lower side of the section 7ª except possibly at the center so that the tendency of the discs to spring outwardly is not destroyed.

This construction of packing has been tested and tried out thoroughly and has proved very practical and efficient for the attainment of the ends for which it is designed. Particularly it is an insurance against oil pumping or oil passage to the combustion chamber of the engine; and this insurance remains a quality of the packing during the entire time that it is used irrespective of wear on the edges of the packing discs. The invention is defined in the appended claims and is to be considered comprehensive of all forms of structure coming within their scope.

I claim:

1. A piston packing comprising a flat disc formed with a helical slot, the inner end thereof starting a short distance from the center of the disc and progressively approaching the periphery of said disc and joining with a gap cut inwardly from the outer edge of the disc, substantially as described.

2. A piston packing comprising a flat disc of metal having a helical slot therethrough, the inner end of which lies a short distance from the center of said disc, said slot progressively approaching the periphery of the disc and at its outer end joining with a gap cut inwardly from one edge of said disc, the metal at the outer sides of said slot tending to spring outwardly but being compressible so that the disc will assume a circular shape when in compressed form.

3. In combination with a piston, a plurality of flat discs laid one over the other at the upper end of the piston, means for holding said discs on the piston, each of said discs being formed with a helical slot cut therethrough, the inner end of which lies closely adjacent the center of the disc and progressively approaches the periphery thereof, joining at its outer end with a gap cut inwardly from an edge of the disc, said discs when placed one over the other being disposed so that the slots in one disc are completely covered by the metal of the superimposed disc, substantially as described.

4. A construction containing the elements in combination defined in claim 3, combined with a stud extending upwardly from the piston through said discs, said discs having openings for the passage of the stud and said openings and the cross section of the stud being such that the discs are held against rotation, substantially as described.

5. In combination with a piston, a stud extending upwardly from the center of the piston, a pair of flat discs having central openings through which said stud passes, said stud and openings being so shaped that the discs are held against rotation and the discs lying against the upper end of the piston, each of said discs being formed with a helical slot cut therethrough, the inner end of which is located adjacent the center of the disc, said slot in each disc progressively approaching the periphery of the disc and joining with a gap cut inwardly from an edge of the disc, the metal of the disc at the outer side of said slot normally springing outwardly and said discs being located so that the slot in the lower disc is completely covered by the metal of the upper disc, and means connected to the upper end of the stud for holding said discs on the piston.

6. A piston packing comprising a flat disc of metal having a central opening therethrough and a helical slot cut therein, said slot at its inner end being located adjacent said opening and progressively approaching the periphery of the disc and joining at its outer end with a gap cut inwardly from an edge of the disc, the metal at the outer side of said slot being resilient and tending to spring outwardly whereby the slot progressively widens from its inner to its outer end and the gap is relatively large, said metal at the outer side of said slots being adapted to be sprung inwardly so as to make the slot of substantially uniform width and decrease the length of the gap whereupon the periphery of the disc will be substantially a true circle.

In testimony whereof I affix my signature.

THURLOW E. McFALL.